United States Patent
Sachdeva

(10) Patent No.: US 10,012,528 B2
(45) Date of Patent: Jul. 3, 2018

(54) WEIGHING APPARATUSES INCLUDING POSITIONING FIXTURE ASSEMBLIES FOR WEIGHING CONNECTING RODS

(71) Applicant: Toyota Motor Engineering & Manufacturing North America, Inc., Erlanger, KY (US)

(72) Inventor: Evan Paul Sachdeva, Blacksburg, VA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 196 days.

(21) Appl. No.: 15/061,003

(22) Filed: Mar. 4, 2016

(65) Prior Publication Data
US 2017/0254695 A1    Sep. 7, 2017

(51) Int. Cl.
*G01M 1/12* (2006.01)
*G01G 21/22* (2006.01)

(52) U.S. Cl.
CPC .............. *G01G 21/22* (2013.01); *G01M 1/12* (2013.01)

(58) Field of Classification Search
CPC ........ G01G 19/00; G01G 21/22; G01G 21/24; G01M 1/12
USPC ........................................................ 177/200
See application file for complete search history.

(56) References Cited

FOREIGN PATENT DOCUMENTS

| CN | 202393475 U | 8/2012 |
|---|---|---|
| CN | 203837790 U | 9/2014 |
| CN | 204177457 U | 2/2015 |
| JP | 2002340659 A | 11/2002 |
| JP | 4006559 B2 | 11/2007 |

OTHER PUBLICATIONS

Computer translation of JP2002-340659(A), Tadashi, Nov. 14, 2017.*
Electronic Connecting Rod Scale, http://catalog.schenck-usa.com/products/400MBPP.php.

* cited by examiner

*Primary Examiner* — Randy Gibson
(74) *Attorney, Agent, or Firm* — Dinsmore & Shohl LLP

(57) ABSTRACT

A weighing apparatus includes a first weighing device including a weighing platform and a second weighing device including a weighing platform located adjacent the first weighing platform. A small end fixture assembly is supported on the weighing platform of the first weighing device that supports a small end of a connecting rod thereon at a location spaced above the weighing platform of the first weighing device. A large end fixture assembly is supported on the weighing platform of the second weighing device that supports a large end of the connecting rod thereon at a location spaced above the weighing platform of the second weighing device.

19 Claims, 11 Drawing Sheets

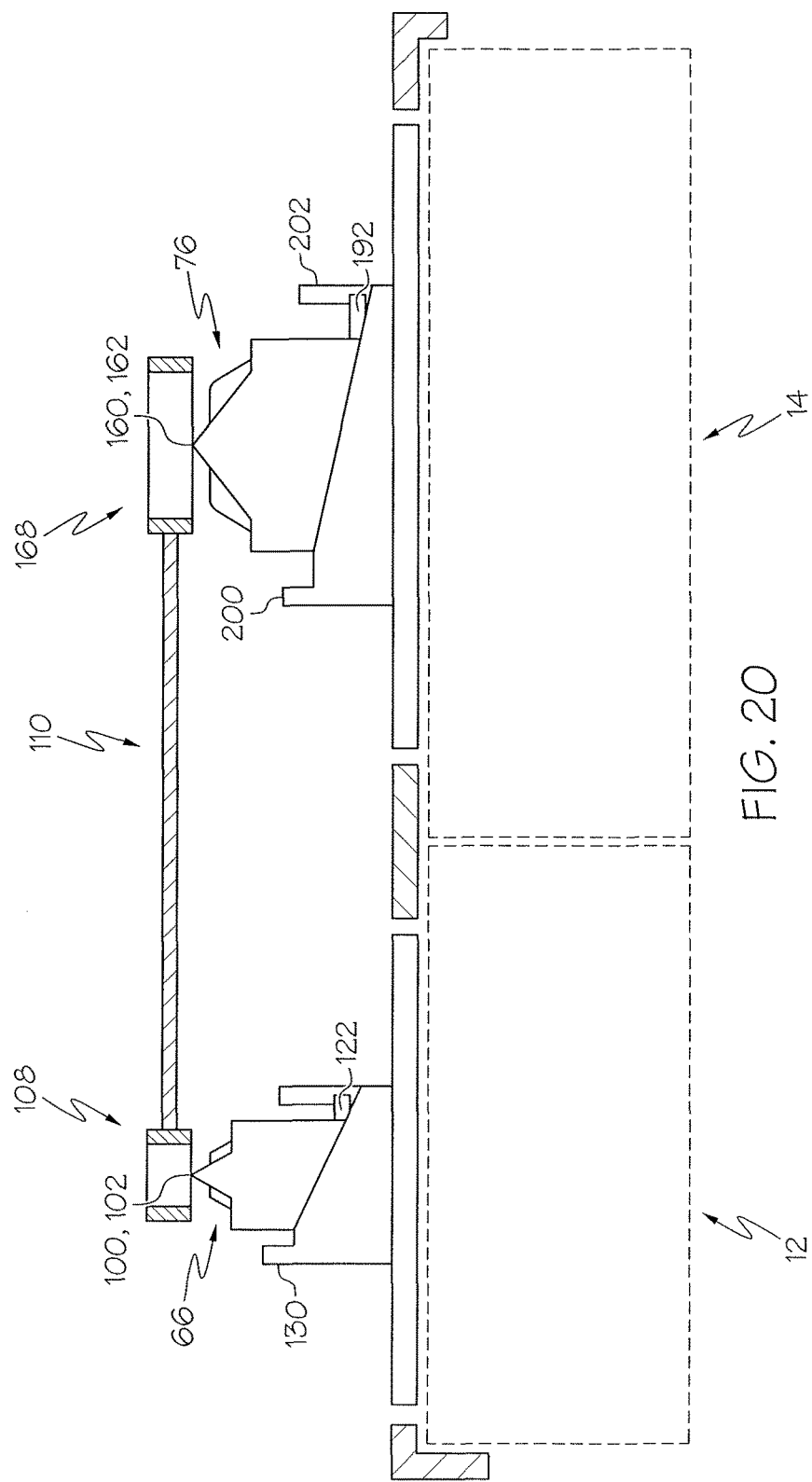

WEIGHING APPARATUSES INCLUDING POSITIONING FIXTURE ASSEMBLIES FOR WEIGHING CONNECTING RODS

TECHNICAL FIELD

The present specification generally relates to weighing apparatuses and, more specifically, to weighing apparatuses including positioning fixture assemblies for weighing connecting rods.

BACKGROUND

Connecting rods connect pistons to crankshafts of internal combustion piston engines. The connecting rods exhibit both rotating motion and reciprocal motion during their use. One connecting rod end, often referred to as the small end, is a reciprocating end that is representative of up and down motion. The other, opposite end, often referred to as the large end, is a bearing end, which rotates with movement of the crankshaft.

In many instances, an internal combustion engine may include a number of pistons and thus a corresponding number of connecting rods. It can be important for an automobile manufacturer to balance the connecting rods to within a predetermined weight of each other to reduce wear and noise. In connecting rod balancing, each end may be weighed independently given the rotational and reciprocal motion of the big and small ends.

SUMMARY

In one embodiment, a weighing apparatus includes a first weighing device including a weighing platform and a second weighing device including a weighing platform located adjacent the first weighing platform. A small end fixture assembly is supported on the weighing platform of the first weighing device that supports a small end of a connecting rod thereon at a location spaced above the weighing platform of the first weighing device. A large end fixture assembly is supported on the weighing platform of the second weighing device that supports a large end of the connecting rod thereon at a location spaced above the weighing platform of the second weighing device.

In another embodiment, a positioning fixture assembly includes a small end fixture assembly including a small end base structure comprising a base plate that rests on a weighing platform of a first weighing device and a centering member guide structure. A small end centering member is received by the centering member guide structure of the small end base structure. The small end centering member moves relative to the centering member guide structure of the small end base structure between a retracted configuration and an extended configuration. A large end fixture assembly includes a large end base structure including a base plate that rests on a weighing platform of a second weighing device and a centering member guide structure. A large end centering member is received by the centering member guide structure of the large end base structure. The large end centering member moves relative to the centering member guide structure of the large end base structure between a retracted configuration and an extended configuration.

In another embodiment, a method of weighing a small end and a large end of a connecting rod is provided. The method includes placing a first weighing device including a weighing platform adjacent a second weighing device including a weighing platform such that the weighing platforms are side-by-side. A small end fixture assembly is placed on the weighing platform of the first weighing device that supports the small end of the connecting rod thereon at a location spaced above the weighing platform of the first weighing device. A large end fixture assembly is placed on the weighing platform of the second weighing device that supports a large end of the connecting rod thereon at a location spaced above the weighing platform of the second weighing device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 20 illustrates further operation of the weighing apparatus of FIG. 1 according to one or more embodiments shown and described herein.

DETAILED DESCRIPTION

Embodiments described herein generally relate to weighing apparatuses for use in weighing and balancing connecting rods. The weighing apparatuses include independent weighing devices that are capable of independently performing a weighing operation and providing weight information for both a large end and a small end of the connecting rods simultaneously. A positioning fixture assembly is provided that is used to position the connecting rods on the weighing devices. The positioning fixture assembly mechanically locates center lines of both a large end hole of the large end and a small end hole of the small end of the connecting rods and uses those center lines to individually weigh the large end of the connecting rod using one of the weighing devices and the small end of the connecting rod using the other of the weighing devices.

Figure 1:
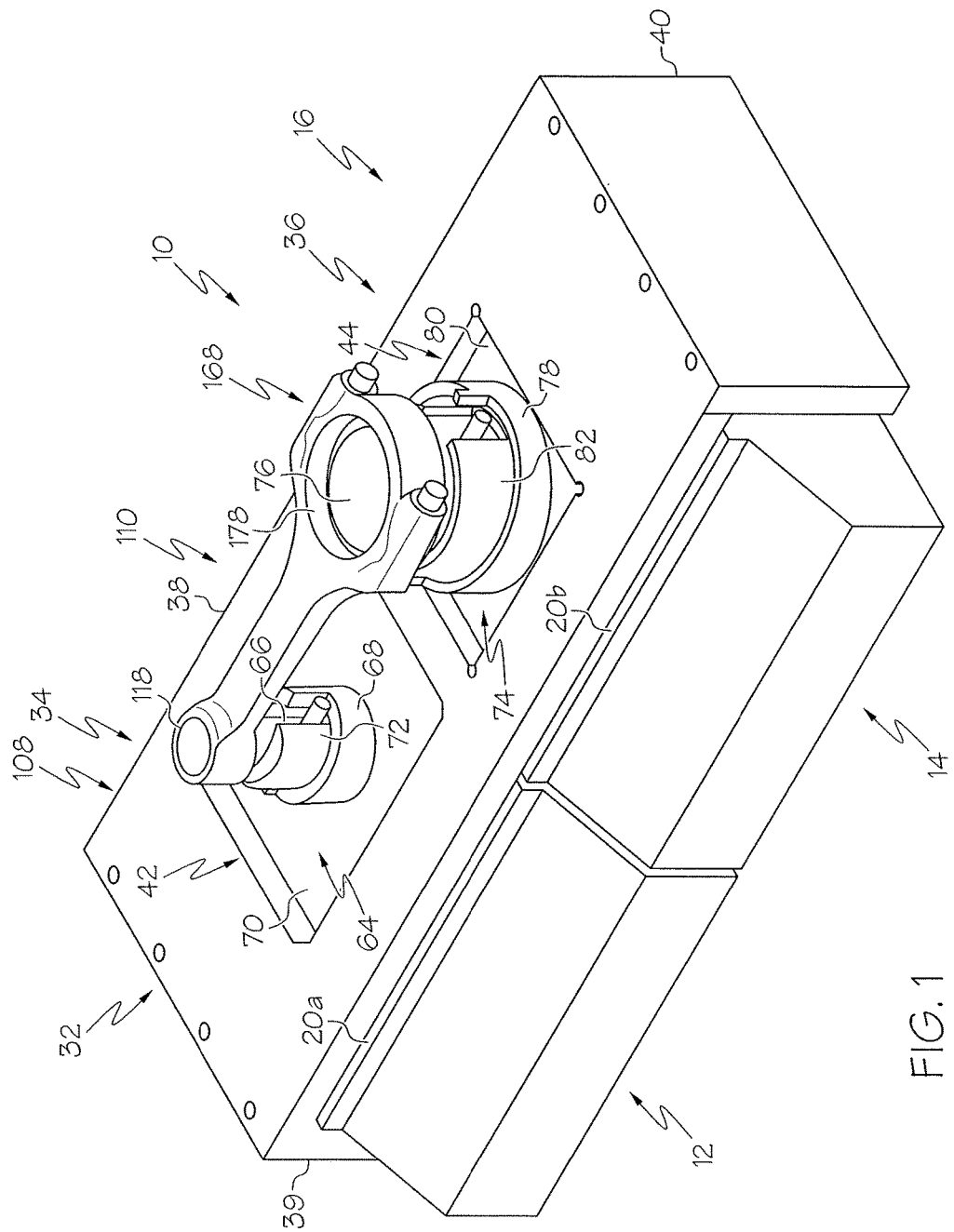
FIG. 1 is a perspective view of a weighing apparatus that includes side-by-side weighing devices and a positioning fixture assembly according to one or more embodiments shown and described herein.
Figure 2:
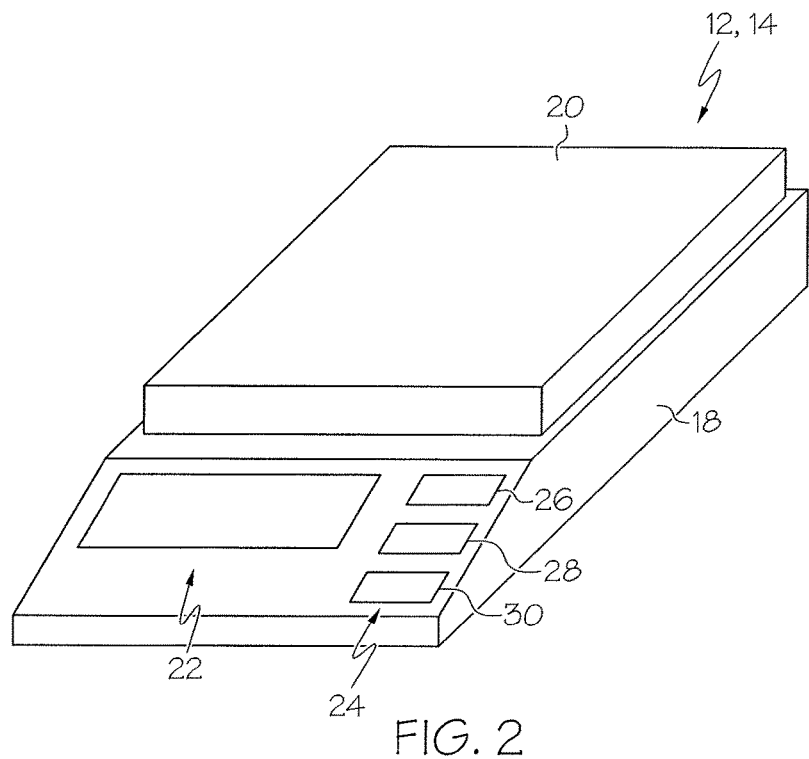
FIG. 2 is a perspective view of a weighing device for use in the weighing apparatus of FIG. 1 according to one or more embodiments shown and described herein.

Referring to FIG. 1, a weighing apparatus 10 includes side-by-side weighing devices 12 and 14 (e.g., electronic scales) and a positioning fixture assembly 16 that spans and utilizes both of the weighing devices 12 and 14. The weighing devices 12 and 14 may be any suitable weighing device and may be the same or different. Referring briefly to FIG. 2, for example, the weighing device 12, 14 may include a housing 18 and a weighing platform 20 supported on the housing 18. The weighing platform 20 of each weighing device 12, 14 may be set level to each other and parallel to the floor to increase weighing accuracy. A display unit 22 may be provided that can display the weighing result. For example, the display unit 22 may be an LED, LCD, OLED display or any other suitable display unit. A speaker may be provided to provide audible output. A user input 24 may be provided. The user input 24 may be provided as controls (e.g., buttons 26, 28 and 30) separate from the display unit 22 and/or may be provided as part of the display unit 22, e.g., through a touch screen display. As one example, button 26 may be an ON/OFF button, button 28 may be a weighing mode button (e.g., to select weight units or mass units) and button 30 may be a tare (set to zero) button. While separate weighing devices 12 and 14 are illustrated, a single weighing device may be used that includes one or more weighing platforms capable of providing independent weighing results.

Referring back to FIG. 1, the positioning fixture assembly 16 includes an alignment guide table 32 that is used to align a small end fixture assembly 34 and a large end fixture assembly 36. The alignment guide table 32 includes an alignment portion 38 that spans the weighing devices 12 and 14 and guide portions 39 and 40 that extend alongside the weighing devices 12 and 14 thereby positioning the weighing devices 12 and 14 side-by-side and limiting movement of the weighing devices 12 and 14 away from one another. In some embodiments, the guide portions 39 and 40 may not be provided.

Figure 3:
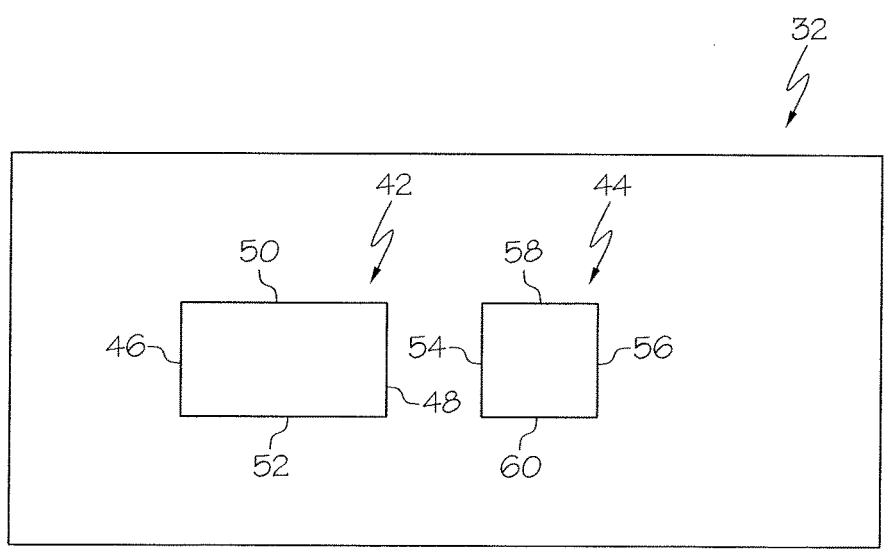
FIG. 3 is a top view of an alignment guide table of the positioning fixture assembly of FIG. 1 that includes a small assembly guide opening and a large assembly guide opening according to one or more embodiments shown and described herein.

The alignment guide table 32 may further include a small assembly guide opening 42 and a large assembly guide opening 44. The small assembly guide opening 42 exposes the weighing platform 20a of the weighing device 12 and the large assembly guide opening 44 exposes the weighing platform 20b of the weighing device 14. The small and large assembly guide openings 42 and 44 are each rectangular in shape. Referring briefly to FIG. 3, the small assembly guide opening 42 may be generally larger in area than the large assembly guide opening 44 and includes first parallel guide edges 46 and 48 and second parallel guide edges 50 and 52. The first parallel guide edges 46 and 48 may allow movement of the small end fixture assembly 34 side-to-side toward and away from the large assembly guide opening 44. The second parallel guide edges 50 and 52 may be substantially perpendicular to the first parallel guide edges 46 and 48 and may allow movement of the small end fixture assembly 34 front-to-back along the weighing platform 20a. In some embodiments, the first parallel guide edges 46, 48 or the second parallel guide edges 50, 52 may be positioned so as not to allow side-to-side or front-to-back movement of the small end fixture assembly 34. Further, while the small assembly guide opening 42 is shown rectangular in shape, any other suitable shape may be used.

The large assembly guide opening 44 may be generally smaller in area than the small assembly guide opening 42 and includes first parallel guide edges 54 and 56 and second parallel guide edges 58 and 60. The first parallel guide edges 54 and 56 may allow movement of the large end fixture assembly 36 side-to-side toward and away from the small assembly guide opening 42. The second parallel guide edges 58 and 60 may be substantially perpendicular to the first parallel guide edges 54 and 56 and may allow movement of the large end fixture assembly 36 front-to-back along the weighing platform 20b. In some embodiments, the first parallel guide edges 54, 56 or the second parallel guide edges 58, 60 may be positioned so as not to allow side-to-side or front-to-back movement of the large end fixture assembly 36. Further, while the large assembly guide opening 44 is shown rectangular in shape, any other suitable shape may be used.

Referring back to FIG. 1, the positioning fixture assembly 16 includes the small end fixture assembly 34 and the large end fixture assembly 36. The small end fixture assembly 34 includes a small end base structure 64, a small end centering member 66 and a small end riser member 68. The small end base structure 64 includes a base plate 70 and a centering member guide structure 72 that extends outwardly from the base plate 70. The base plate 70 has a rectangular shape that cooperates with the rectangular shape of the small assembly guide opening 42. In some embodiments, the base plate 70 may be smaller than the small assembly guide opening 42 in one or both of the widthwise and lengthwise directions to allow movement of the small end fixture assembly 34 in one or both side-to-side and front-to-back directions.

The large end fixture assembly 36 includes a large end base structure 74, a large end centering member 76 and a large end riser member 78. The large end base structure 74 includes a base plate 80 and a centering member guide structure 82 that extends outwardly from the base plate 80. The base plate 80 has a rectangular shape that cooperates with the rectangular shape of the large assembly guide opening 44. In some embodiments, the base plate 80 may be smaller than the large assembly guide opening 44 in one or both of the widthwise and lengthwise directions to allow movement of the large end fixture assembly in one or both side-to-side and front-to-back directions.

Figure 4:
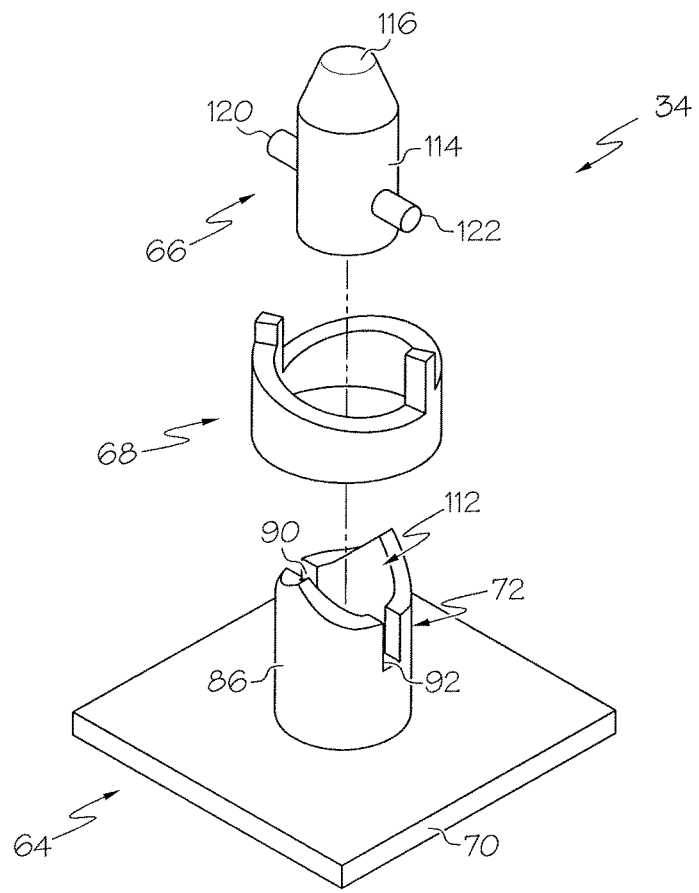
FIG. 4 is a perspective exploded view of an embodiment of a small end fixture assembly of the positioning fixture assembly of FIG. 1 according to one or more embodiments shown and described herein.

Referring to FIG. 4, the small end fixture assembly 34 is shown in greater detail. The small end fixture assembly 34 includes the small end base structure 64, the small end centering member 66 and the small end riser member 68. The small end base structure 64 includes the base plate 70 and the centering member guide structure 72 that extends outwardly from the base plate 70. In some embodiments, the centering member guide structure 72 extends outwardly at a geometric center of the base plate 70.

Figure 5:
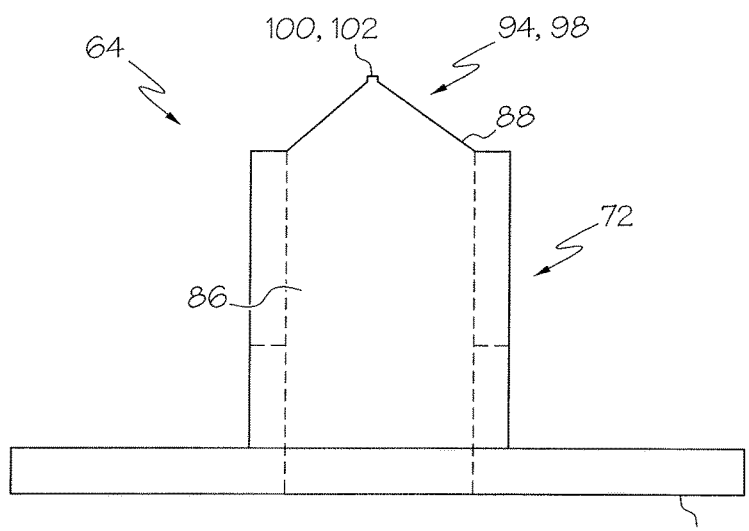
FIG. 5 is a side view of a small end base structure of the small end fixture assembly of FIG. 4 according to one or more embodiments shown and described herein.
Figure 6:
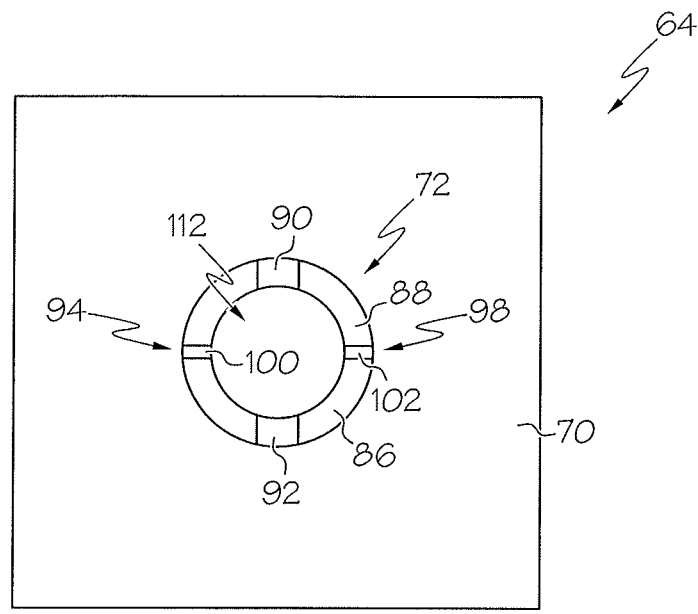
FIG. 6 is a top view of the small end base structure of FIG. 5.
Figure 7:
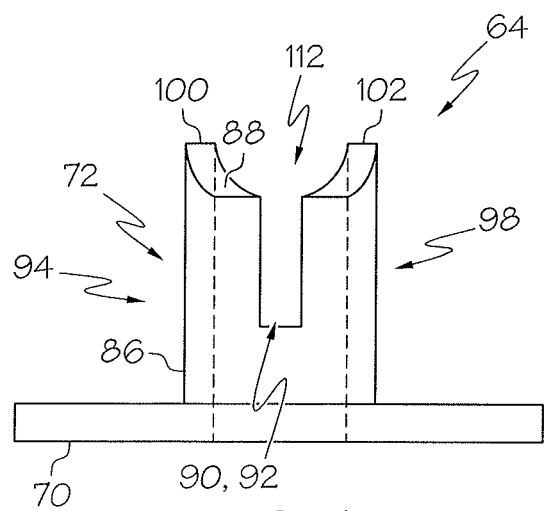
FIG. 7 is another side view of the small end base structure of FIG. 5.

FIGS. 5-7 illustrate the small end base structure 64 in isolation. The centering member guide structure 72 of the small end base structure 64 includes a sidewall 86 that extends generally perpendicularly to the base plate 70 to an outer edge 88. Opposing slots 90 and 92 are provided through the sidewall 86 (180 degrees from one another), extending along a height of the centering member guide structure 72 (perpendicular to the base plate 70) and dividing the centering member guide structure 72 into opposing support sections 94 and 98. The outer edge 88 at each support section 94 and 98 extends to a support ridge 100 and 102 that define an apex centrally located at each support section 94 and 98. The support ridges 100 and 102 provide support surfaces that are aligned linearly along the thickness of the sidewall 86 that are used to support a small end 108 of a connecting rod 110 (FIG. 1) thereon during a weighing operation as will be described below.

Referring back to FIG. 4, the small end centering member 66 is sized to be slidingly received within a bore 112 of the centering member guide structure 72. The small end centering member 66 includes a sidewall 114 having a width that is sized to be received within the bore 112. While the sidewall 114 and the bore 112 are illustrated as being circular in shape, they can be any other suitable shape such as any suitable rounded or polygonal shape. The small end centering member 66 further includes a tapering head portion 116 that is sized to be received within a small end hole 118 of the small end 108 of the connecting rod 110 (FIG. 1). The tapering head portion 116 can aid in centering the small end hole 118 on the small end centering member 66.

Guide projections 120 and 122 extend outwardly from opposite sides of the sidewall 114. The guide projections 120 and 122 extend a distance outwardly from the sidewall 114 to be slidingly received within the slots 90 and 92 and extend outwardly beyond the sidewall 86 of the centering member guide structure 72 (FIG. 1). The guide projections 120 and 122 and the slots 90 and 92 along with the bore 112 cooperate to guide the small end centering member 66 up and down in a linear fashion relative to the centering member guide structure 72. While two guide projections 120 and 122 are illustrated, more or less than two guide projections 120 and 122 may be used.

Figure 8:
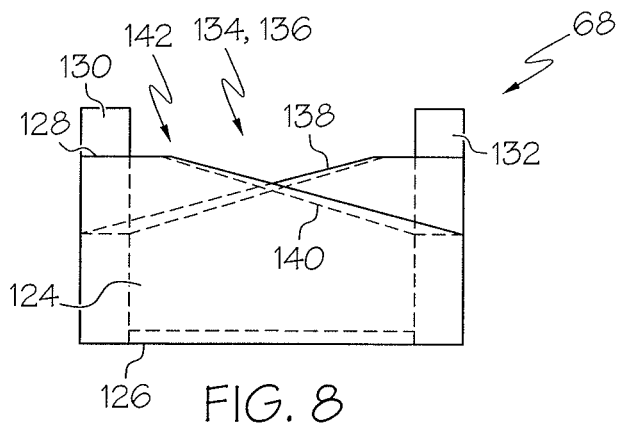
FIG. 8 is a side view of a small end riser member of the small end fixture assembly of FIG. 4 according to one or more embodiments shown and described herein.
Figure 9:
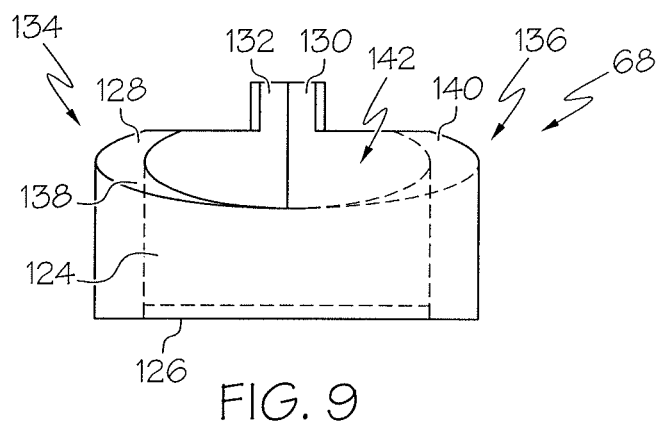
FIG. 9 is another side view of the small end riser member of FIG. 8.
Figure 10:
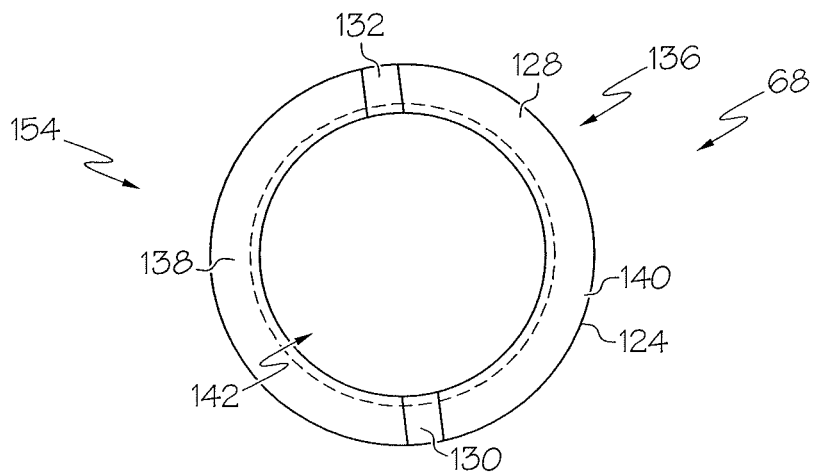
FIG. 10 is a top view of the small end riser member of FIG. 8.

To move the small end centering member 66 up and down relative to the centering member guide structure 72, the small end riser member 68 is provided. Referring to FIGS. 8-10, the small end riser member 68 includes a sidewall 124 that includes a base edge 126 and a cam edge 128 that is opposite the base edge 126. Opposing stop projections 130 and 132 extend outwardly from the cam edge 128, dividing the cam edge 128 into opposing cam portions 134 and 136. The cam edge 128 at the cam portion 134 increases in distance from the base edge 126 (in elevation) from the stop projection 130 toward the stop projection 132 along the length of the cam edge 128 forming a guide ramp 138. Similarly, the cam edge 128 at the cam portion 136 increases in distance from the base edge 126 (in elevation) from the stop projection 132 toward the stop projection 130 along the length of the cam edge 128 forming a guide ramp 140. The small end riser member 68 has an opening 142 extending therethrough that is sized to sliding receive the centering member guide structure 72 such that the small end riser member 68 can be rotated relative to the centering member guide structure 72 with the guide projections 120 and 122 engaged with the guide ramps 138 and 140 of the cam edge 128 (FIG. 1).

Figure 11:
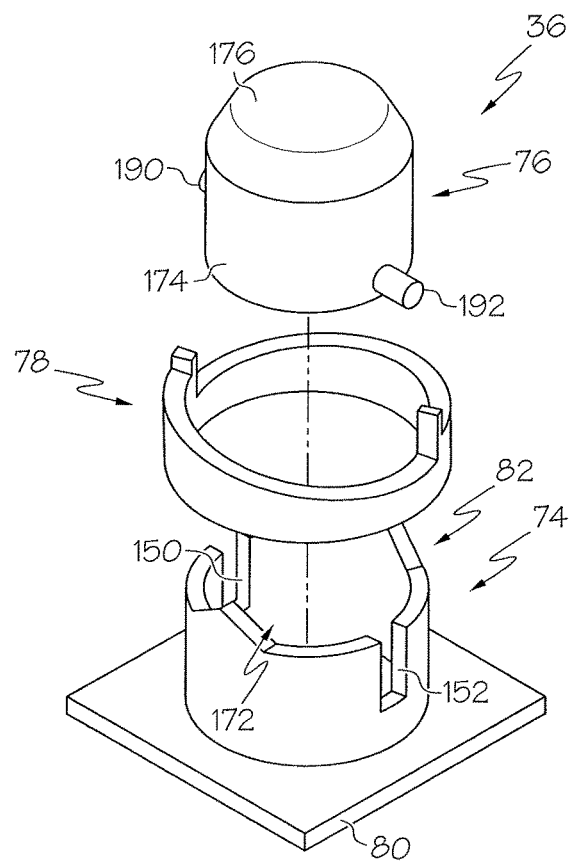
FIG. 11 is a perspective exploded view of an embodiment of a large end fixture assembly of the positioning fixture assembly of FIG. 1 according to one or more embodiments shown and described herein.

Referring to FIG. 11, the large end fixture assembly 36 is shown in greater detail. The large end fixture assembly 36 includes the large end base structure 74, the large end centering member 76 and the large end riser member 78. The large end base structure 74 includes the base plate 80 and the centering member guide structure 82 that extends outwardly from the base plate 80. In some embodiments, the centering member guide structure 82 extends outwardly at a geometric center of the base plate 80.

Figure 12:
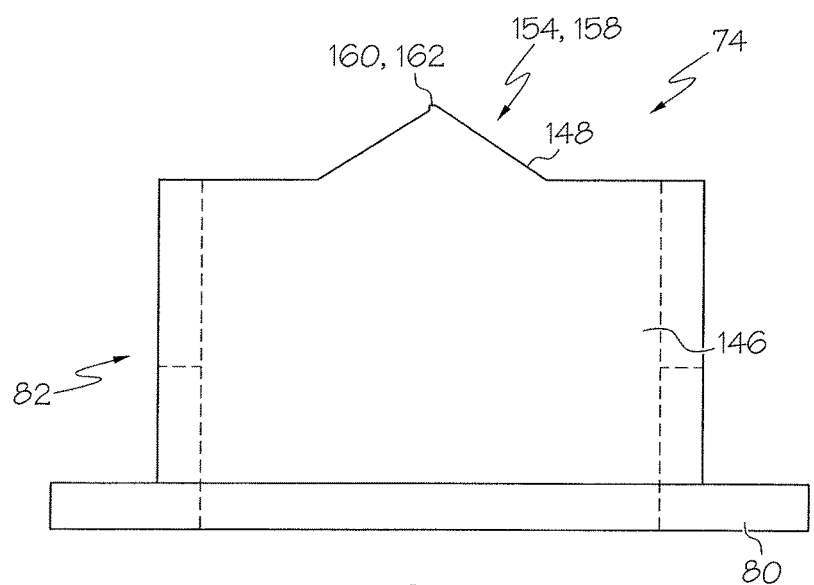
FIG. 12 is a side view of a large end base structure of the large end fixture assembly of FIG. 11 according to one or more embodiments shown and described herein.
Figure 13:
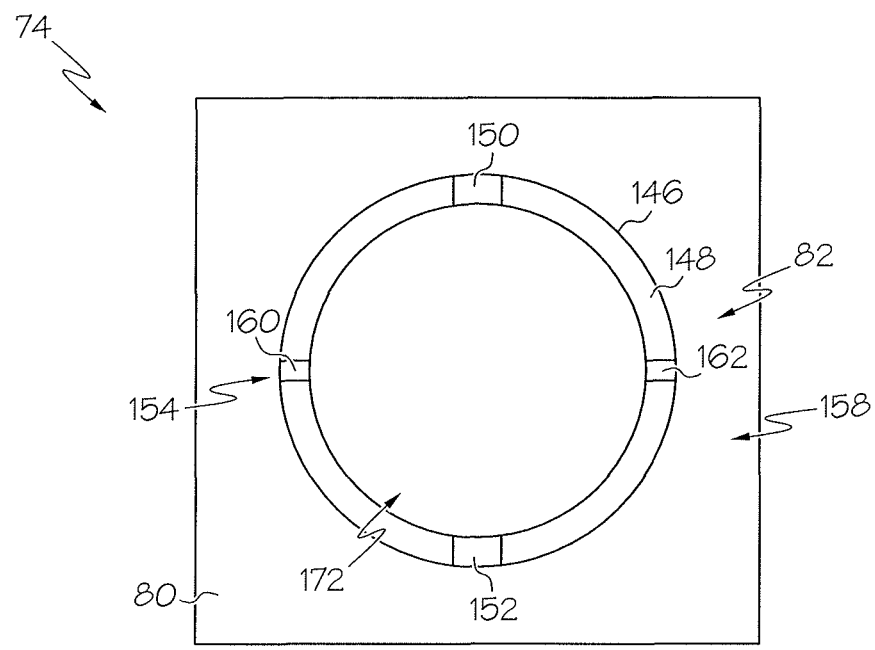
FIG. 13 is a top view of the large end base structure of FIG. 12.
Figure 14:
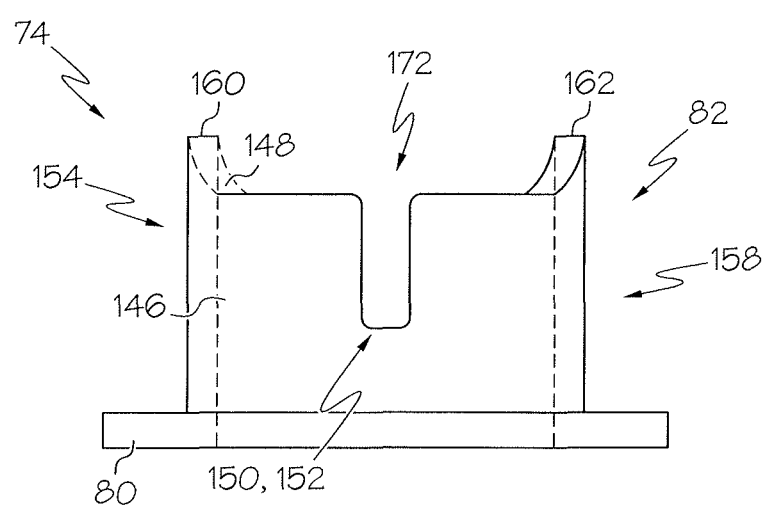
FIG. 14 is another side view of the large end base structure of FIG. 12.

FIGS. 12-14 illustrate the large end base structure 74 in isolation. The centering member guide structure 82 of the large end base structure 74 includes a sidewall 146 that extends generally perpendicularly to the base plate 80 to an outer edge 148. Opposing slots 150 and 152 are provided through the sidewall 146 (180 degrees from one another), extending along a height of the centering member guide structure 82 (perpendicular to the base plate 80) and dividing the centering member guide structure 82 into opposing support sections 154 and 158. The outer edge 148 at each support section 154 and 158 extends to a support ridge 160 and 162 that define an apex centrally located at each support section 154 and 158. The support ridges 160 and 162 provide support surfaces that are aligned linearly along the thickness of the sidewall 146 that are used to support a large end 168 of the connecting rod 110 (FIG. 1) thereon during a weighing operation as will be described below.

Referring back to FIG. 11, the large end centering member 76 is sized to be slidingly received within a bore 172 of the centering member guide structure 82. The large end centering member 76 includes a sidewall 174 having a width that is sized to be received within the bore 172. While the sidewall 174 and the bore 172 are illustrated as being circular in shape, they can be any other suitable shape such as any suitable rounded or polygonal shape. The large end centering member 76 further includes a tapering head portion 176 that is sized to be received within a large end hole 178 of the large end 180 of the connecting rod 110 (FIG. 1). The tapering head portion 176 can aid in centering the large end hole 178 on the large end centering member 76.

Guide projections 190 and 192 extend outwardly from opposite sides of the sidewall 174. The guide projections 190 and 192 extend a distance outwardly from the sidewall 174 to be slidingly received within the slots 150 and 152 and extend outwardly beyond the sidewall 174 of the centering member guide structure 82 (FIG. 1). The guide projections 190 and 192 and the slots 150 and 152 along with the bore 172 cooperate to guide the large end centering member 76 up and down in a linear fashion relative to the centering member guide structure 82. While two guide projections 190 and 192 are illustrated, more or less than two guide projections 190 and 192 may be used.

Figure 15:
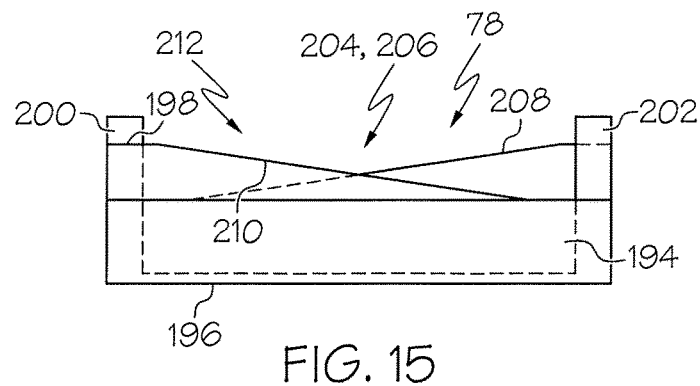
FIG. 15 is a side view of a large end riser member of the large end fixture assembly of FIG. 11 according to one or more embodiments shown and described herein.
Figure 16:
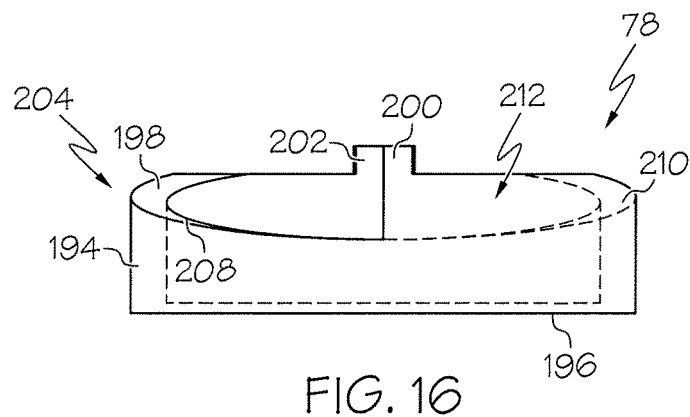
FIG. 16 is another side view of the small end riser member of FIG. 15.
Figure 17:
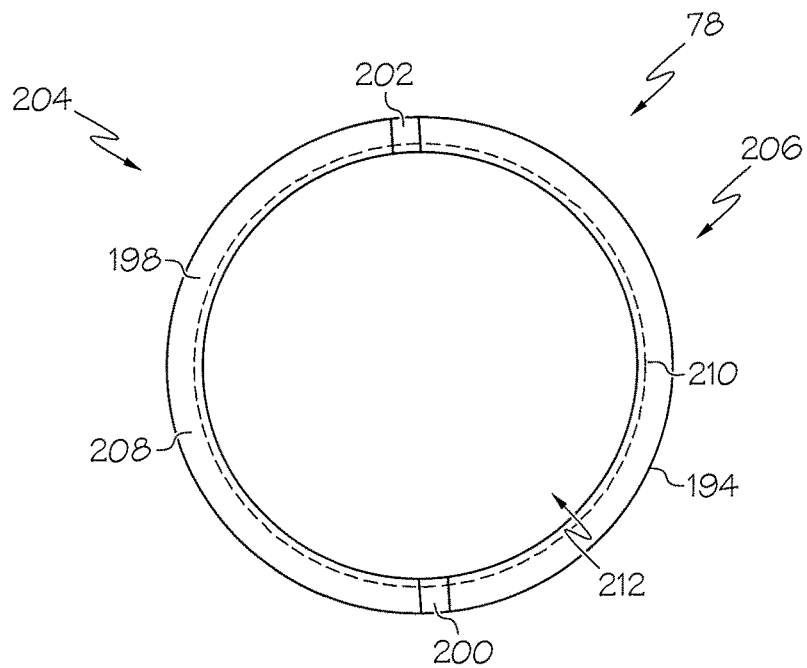
FIG. 17 is a top view of the small end riser member of FIG. 15.

To move the large end centering member 76 up and down relative to the centering member guide structure 82, the large end riser member 78 is provided. Referring to FIGS. 15-17, the large end riser member 78 includes a sidewall 194 that includes a base edge 196 and a cam edge 198 that is opposite the base edge 196. Opposing stop projections 200 and 202 extend outwardly from the cam edge 198, dividing the cam edge 198 into opposing cam portions 204 and 206. The cam edge 198 at the cam portion 204 increases in distance from the base edge 196 (in elevation) from the stop projection 200 toward the stop projection 202 along the length of the cam edge 198 forming a guide ramp 208. Similarly, the cam edge 198 at the cam portion 206 increase in distance from the base edge 196 (in elevation) from the stop projection 202 toward the stop projection 200 along the length of the cam edge 198 forming a guide ramp 210. The large end riser member 78 has an opening 212 extending therethrough that is sized to sliding receive the centering member guide structure 82 such that the large end riser member 78 can be rotated relative to the centering member guide structure 82 with the guide projections 190 and 192 engaged with the guide ramps 208 and 210 of the cam edge 128 (FIG. 1).

Figure 18:
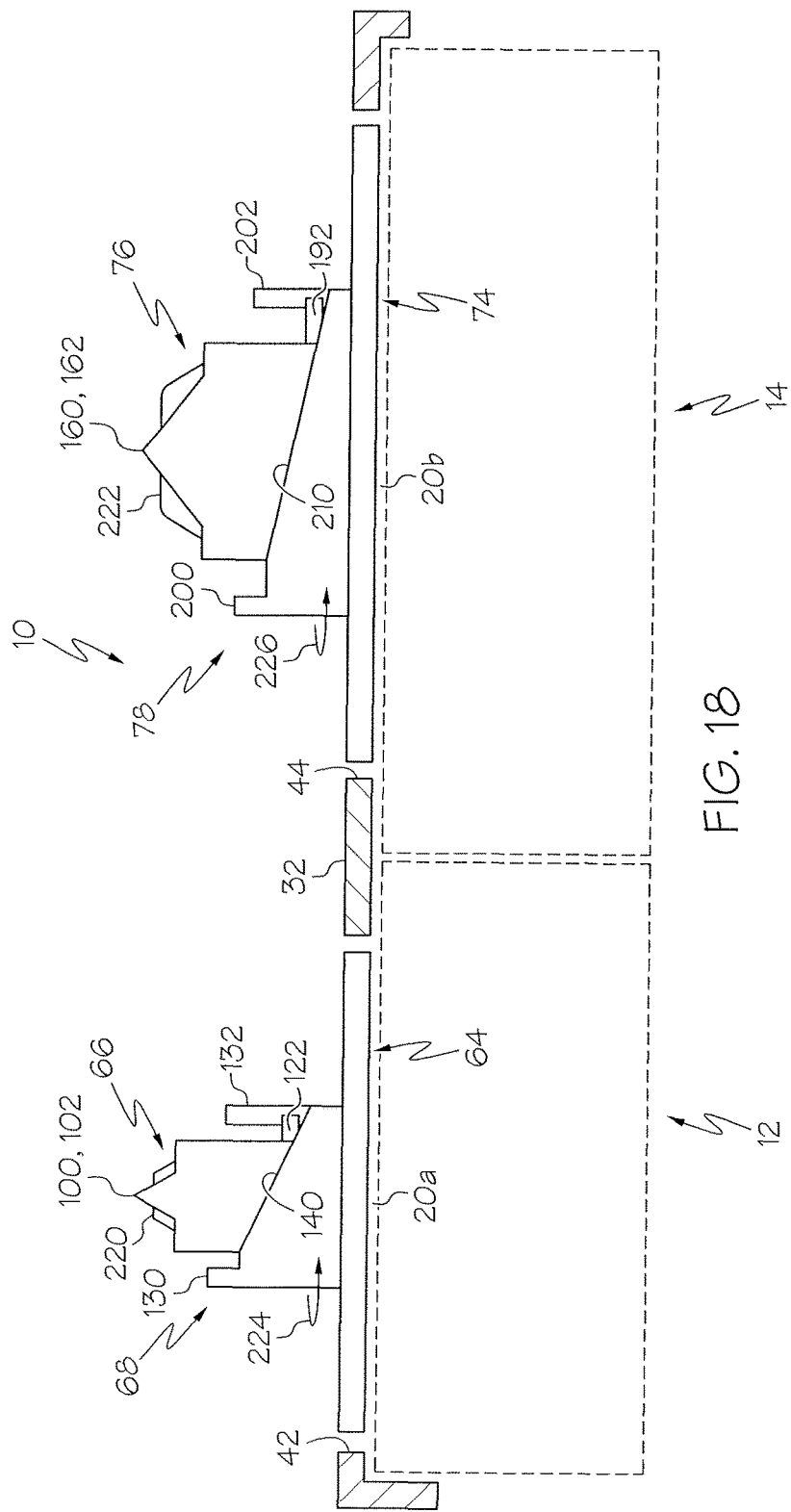
FIG. 18 illustrates operation of the weighing apparatus of FIG. 1 according to one or more embodiments shown and described herein.
Figure 19:
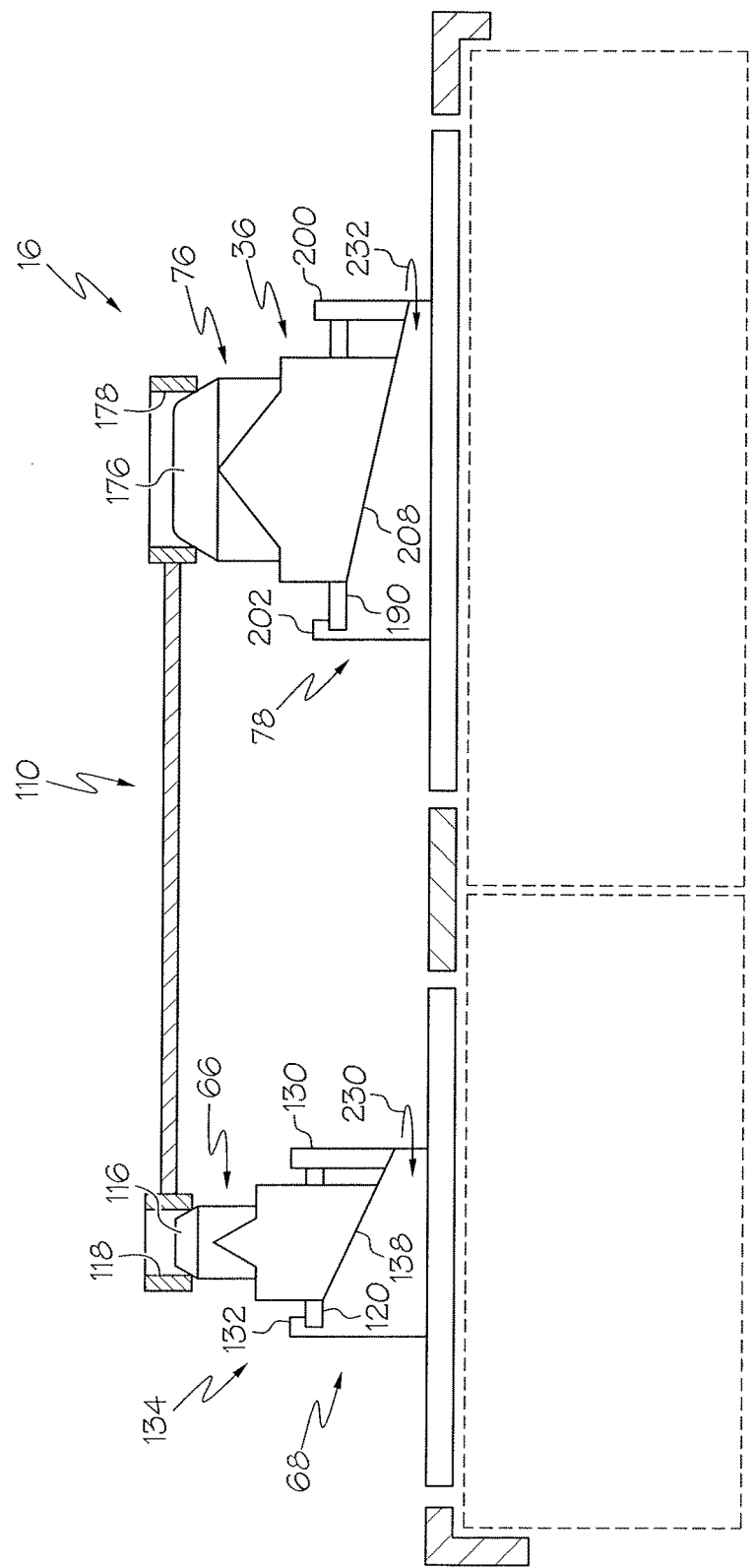
FIG. 19 illustrates further operation of the weighing apparatus of FIG. 1 according to one or more embodiments shown and described herein.

FIGS. 18-20 illustrate operation of the weighing apparatus 10. Referring first to FIG. 18, the weighing apparatus includes the side-by-side weighing devices 12 and 14 and the positioning fixture assembly 16 that spans and utilizes both of the weighing devices 12 and 14. The weighing devices 12 and 14 can be checked that the weighing platforms 20a and 20b are level and planar with each other as well as level to the ground to provide accurate readings. The alignment guide table 32 may be placed over the weighing platforms 20a and 20b and the small end fixture assembly 34 may be placed in the small assembly guide opening 42 and the large end fixture assembly 36 may be placed in the large assembly guide opening 44. The small end base structure 64 and the large end base structure 74 should slide freely within their respective small assembly guide opening 42 and large assembly guide opening 44. A lubricant, such as graphite powder may be applied to one or more sides of the openings 42 and 44. Once the positioning fixture assembly 16 is in place on the weighing devices 12 and 14, the operator may then tare the weighing devices 12 and 14.

In FIG. 18, the small end fixture assembly 34 and the large end fixture assembly 36 are shown in lowered or retracted configurations with the small end centering member 66 and the large end centering member 76 retracted into the centering member guide structures 72 and 82. For a centering operation, the small end centering member 66 and the large end centering member 76 may be retracted into the centering member guide structures 72 and 82 to where ends 220 and 222 are located below their respective support ridges 100, 102 and 160, 162.

To raise or move the small end centering member 66 and the large end centering member 76 toward extended configurations, the small end riser member 68 and the large end riser member 78 may be manually turned in the direction of arrows 224 and 226 such that the guide projections 120 and 122 of the small end centering member 66 ride along or follow the guide ramps 138 and 140 and the guide projections 190 and 192 of the large end centering member 76 follow the guide ramps 208 and 210. Because the guide projections 120, 122, 190 and 192 are located in their respective slots 90, 92, 150, 152, the small and large end centering members 66 and 76 move linearly toward their extended configurations.

FIG. 19 illustrates the small end fixture assembly 34 and the large end fixture assembly 36 in the extended configurations. The connecting rod 110 may then be placed on the positioning fixture assembly 16 with the tapering head portion 116 of the small end centering member 66 received by the small end hole 118 and the tapering head portion 176 of the large end centering member 76 received by the large end hole 178.

To lower or move the small end centering member 66 and the large end centering member 76 toward their retracted configurations, the small end riser member 68 and the large end riser member 78 may be manually turned in the direction of arrows 230 and 232 such that the guide projections 120 and 122 of the small end centering member 66 ride along or follow the guide ramps 138 and 140 and the guide projections 190 and 192 of the large end centering member 76 follow the guide ramps 208 and 210. Referring to FIG. 20, with the small end centering member 66 and the large end centering member 76 in their retracted configurations, the connecting rod 110 is supported by the support ridges 100, 102 and 160, 162, with the support ridges 100 and 102 supporting the small end 108 of the connecting rod 110 and the support ridges 160 and 162 supporting the large end 168 of the connecting rod 110. At this point, a reading may be taken from the weighing devices 12 and 14. The steps may be repeated for multiple connecting rods 110, or even raw connecting rods (i.e., prior to final machining) to determine whether they fall within a predetermined range. In some embodiments, a balancing operation may be performed where material is removed from one or both of the small end 108 and large end 168 to balance multiple connecting rods 110.

The above-described weighing apparatuses including position fixture assembly allow connecting rods to be weighed and balanced without any need for computers or additional calculations. The small end centering member and the large end centering member are used to center the small end hole and the large end hole over the support ridges, which support the small end and large end of the connecting rod during a weighing operation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A weighing apparatus comprising:
a first weighing device including a weighing platform;
a second weighing device including a weighing platform located adjacent the first weighing platform;
a small end fixture assembly supported on the weighing platform of the first weighing device that supports a small end of a connecting rod thereon at a location spaced above the weighing platform of the first weighing device; and
a large end fixture assembly supported on the weighing platform of the second weighing device that supports a large end of the connecting rod thereon at a location spaced above the weighing platform of the second weighing device;
wherein the small end fixture assembly comprises a small end centering member that moves between a retracted configuration and an extended configuration relative to the weighing platform of the first weighing device.

2. The weighing apparatus of claim 1 further comprising an alignment guide table that spans the first weighing device and the second weighing device, the alignment guide table includes a small assembly guide opening that exposes the weighing platform of the first weighing device, the small assembly guide opening being sized to receive the small end fixture assembly.

3. The weighing apparatus of claim 2, wherein the alignment guide table includes a large assembly guide opening that exposes the weighing platform of the second weighing device, the large assembly guide opening being sized to receive the large end fixture assembly.

4. The weighing apparatus of claim 1, wherein the small end centering member is received by a centering member guide structure, the small end centering member is configured to move relative to the centering member guide structure between the retracted configuration and the extended configuration.

5. The weighing apparatus of claim 4 comprising a small end riser member rotatably located about the centering member guide structure, the small end centering member including a guide projection that extends outward through a slot in a sidewall of the centering member guide structure to ride along a cam edge of the small end riser member to move between the retracted configuration and the extended configuration with rotation of the small end riser member about the centering member guide structure.

6. The weighing apparatus of claim 4, wherein the centering member guide structure includes a sidewall and an outer edge that extends to support ridges that provide support surfaces to support the small end of the connecting rod thereon.

7. The weighing apparatus of claim 6, wherein the support ridges are aligned linearly.

8. The weighing apparatus of claim 1, wherein the large end fixture assembly comprises a large end centering member having a retracted configuration and an extended configuration.

9. The weighing apparatus of claim 8, wherein the large end centering member is received by a centering member guide structure, the large end centering member is configured to move relative to the centering member guide structure between the retracted configuration and the extended configuration.

10. The weighing apparatus of claim 9 comprising a large end riser member rotatably located about the centering member guide structure, the large end centering member including a guide projection that extends outward through a slot in a sidewall of the centering member guide structure to ride along a cam edge of the large end riser member to move between the retracted configuration and the extended configuration with rotation of the large end riser member about the centering member guide structure.

11. The weighing apparatus of claim 9, wherein the centering member guide structure includes a sidewall and an outer edge that extends to support ridges that provide support surfaces to support the large end of the connecting rod thereon.

12. The weighing apparatus of claim 11, wherein the support ridges are aligned linearly.

13. A positioning fixture assembly comprising:
a small end fixture assembly comprising
a small end base structure comprising a base plate that rests on a weighing platform of a first weighing device and a centering member guide structure supported on the base plate; and
a small end centering member received by the centering member guide structure of the small end base structure, the small end centering member moves relative to the centering member guide structure of the small end base structure between a retracted configuration and an extended configuration; and
a large end fixture assembly comprising
a large end base structure comprising a base plate that rests on a weighing platform of a second weighing device and a centering member guide structure supported on the base plate; and
a large end centering member received by the centering member guide structure of the large end base structure, the large end centering member moves relative to the centering member guide structure of the large end base structure between a retracted configuration and an extended configuration.

14. The positioning fixture assembly of claim 13, wherein the small end fixture assembly comprises a small end riser member rotatably located about the centering member guide structure of the small end base structure, the small end centering member including a guide projection that extends outward through a slot in a sidewall of the centering member guide structure of the small end base structure to ride along a cam edge of the small end riser member to move between the retracted configuration and the extended configuration with rotation of the small end riser member about the centering member guide structure of the small end base structure.

15. The positioning fixture assembly of claim 14, wherein the large end fixture assembly comprises a large end riser member rotatably located about the centering member guide structure of the large end base structure, the large end centering member including a guide projection that extends outward through a slot in a sidewall of the centering member guide structure of the large end base structure to ride along a cam edge of the large end riser member to move between the retracted configuration and the extended configuration with rotation of the large end riser member about the centering member guide structure of the large end base structure.

16. The positioning fixture assembly of claim 13 further comprising an alignment guide table configured to span the first weighing device and the second weighing device, the alignment guide table comprising
a small assembly guide opening that exposes the weighing platform of the first weighing device, the small assembly guide opening being sized to receive the small end fixture assembly; and
a large assembly guide opening that exposes the weighing platform of the second weighing device, the large assembly guide opening being sized to receive the large end fixture assembly.

17. A method of weighing a small end and a large end of a connecting rod, the method comprising;
placing a first weighing device including a weighing platform adjacent a second weighing device including a weighing platform such that the weighing platforms are side-by-side;
placing a small end fixture assembly on the weighing platform of the first weighing device that supports the small end of the connecting rod thereon at a location spaced above the weighing platform of the first weighing device; and placing a large end fixture assembly on the weighing platform of the second weighing device that supports a large end of the connecting rod thereon at a location spaced above the weighing platform of the second weighing device;

wherein the small end fixture assembly comprises a small end centering member that moves between a retracted configuration and an extended configuration relative to the weighing platform of the first weighing device.

18. The method of claim 17 further comprising providing an alignment guide table spanning the first weighing device and the second weighing device, the alignment guide table comprising
- a small assembly guide opening exposing the weighing platform of the first weighing device, the small assembly guide opening receiving the small end fixture assembly; and
- a large assembly guide opening exposing the weighing platform of the second weighing device, the large assembly guide opening receiving the large end fixture assembly.

19. The method of claim 16 further comprising
centering a small end opening of the connecting rod on the moveable small end centering member; and
centering a large end opening of the connecting rod on a moveable large end centering member.

* * * * *